United States Patent [19]

Schupp et al.

[11] Patent Number: 4,721,758

[45] Date of Patent: Jan. 26, 1988

[54] BINDERS FOR CATHODIC ELECTROCOATING WHICH CONTAIN NON-TERTIARY BASIC AMINO GROUPS IN ADDITION TO PHENOLIC MANNICH BASES

[75] Inventors: Eberhard Schupp, Schwetzingen; Rolf Osterloh, Gruenstadt; Werner Loch, Erpolzheim; Klaas Ahlers, Muenster, all of Fed. Rep. of Germany

[73] Assignee: BASF Aktiengesellschaft, Ludwigshafen, Fed. Rep. of Germany

[21] Appl. No.: 744,200

[22] Filed: Jun. 13, 1985

[30] Foreign Application Priority Data

Jun. 16, 1984 [DE] Fed. Rep. of Germany ....... 3422457

[51] Int. Cl.$^4$ .................. C08L 61/14; C08L 61/34; C08L 61/00; C08L 33/08
[52] U.S. Cl. .................................... 525/490; 525/138; 525/428
[58] Field of Search .............. 525/481, 482, 490, 138, 525/428; 523/415, 416; 204/181.2

[56] References Cited

U.S. PATENT DOCUMENTS

| | | | |
|---|---|---|---|
| 3,994,989 | 11/1976 | Kempter et al. | 260/831 |
| 4,225,479 | 9/1980 | Hicks | 523/416 |
| 4,312,799 | 1/1982 | Sekmakas et al. | 525/396 |
| 4,369,290 | 1/1983 | Evans et al. | 525/137 |
| 4,396,732 | 8/1983 | Sekmakas et al. | 523/416 |
| 4,544,687 | 10/1985 | Schupp et al. | 523/415 |
| 4,565,838 | 1/1986 | Paar et al. | 523/416 |

FOREIGN PATENT DOCUMENTS

1457932 8/1976 United Kingdom .

*Primary Examiner*—Allan M. Lieberman
*Attorney, Agent, or Firm*—Keil & Weinkauf

[57] ABSTRACT

The present invention relates to binders for cathodic electrocoating. These binders contain non-tertiary basic amino groups in addition to phenolic Mannich bases and consist of a mixture or precondensate of a polymer, polycondensate or polyadduct which has a mean molecular weight of 800 to 8,000 and a content of basic, primary and/or secondary amino groups of 0.8 to 8 equivalents per 1,000 molecular weight units and one or more phenolic Mannich bases prepared from one or more polynuclear polyphenols, formaldehyde or a formaldehyde donor and one or more secondary aliphatic amines, not more than one equivalent of a secondary amine and not more than 2 equivalents of formaldehyde being employed per equivalent of phenol for the preparation of component (B). These binders can be rendered water-dilutable by the addition of an acid and are suitable for the cathodic electrocoating of electrically conductive articles.

13 Claims, No Drawings

BINDERS FOR CATHODIC ELECTROCOATING WHICH CONTAIN NON-TERTIARY BASIC AMINO GROUPS IN ADDITION TO PHENOLIC MANNICH BASES

The present invention relates to binders which contain non-tertiary basic amino groups in addition to phenolic Mannich bases and can be used for the preparation of electrocoating finishes which are distinguished by a high bath pH and a low baking temperature.

Most of the conventional electrocoating finishes are present as stable and hence usable dispersions only at a pH of less than 6.5, frequently even less than 5. However, this means that they can only be used in expensive plants lined with plastic or consisting of stainless steel. Moreover, conventional electrocoating finishes require baking temperatures of about 180° to 195° C.

German Laid-Open Application DOS No. 2,320,536 describes heat-curable condensates which consist of Mannich bases of polyhydric phenols and can be used, if necessary in combination with substances which are usually curable with phenol/formaldehyde resins, as coating agents, impregnating agents and adhesives.

German Published Application DAS No. 2,320,301 describes self-crosslinking synthetic resins and their use for the cathodic electrocoating of electrically conductive metal surfaces. They are prepared by reacting low molecular weight Mannich bases, obtained from polyhydric phenols, with polyepoxide compounds.

Self-crosslinking Mannich resins and their use as binders for cathodic electrocoating finishes are also described in German Published Application DAS No. 2,419,179. In addition to low molecular weight polyhydric phenols, prepolymers of such phenols and low molecular weight epoxy resins are also employed for the Mannich reaction.

U.S. Pat. No. 4,312,799 describes amino resins which are prepared from reaction products of bisphenols with less than the stoichiometric amount of epoxy resins, the resulting prepolymers being converted to Mannich bases with formaldehyde and secondary amines, and reacted with further epoxy resin, as described in German Published Application DAS No. 2,419,179.

In every case, the reaction products contain exclusively tertiary amino groups. Hence, crosslinking during baking can take place essentially only by condensation of the phenol nuclei via methylene bridges, similarly to the curing of phenol resins, baking temperatures above 160° C., preferably about 180° C., being required for this purpose.

U.S. Pat. No. 4,369,290 relates to a heat-curable coating agent which consists of a polymer possessing active hydrogen atoms and a crosslinking agent. The crosslinking agent used in this case is an aminomethyl-substituted aromatic ring-phenol derivative which contains an aromatic ring, a free hydroxyl group bonded to the aromatic ring, and two or more methyleneamine groups bonded to the aromatic ring. Products of this type are also recommended for use in cathodic electrocoating finishes, and the polymer possessing active hydrogen atoms which has to be used is one which possesses basic groups and becomes water-soluble on protonation with acids. However, the products according to U.S. Pat. No. 4,369,290 are not very suitable for this intended use since the crosslinking agents used in this case have a high content of strongly basic groups which, like the basic groups of the polymer possessing active hydrogen atoms, are protonated when an acid is added. The consequence of this is that such compositions require a large amount of neutralizing agent, with the result that the electrical properties of the coating bath are adversely affected so that only poor throwing power and low electric strengths are achieved.

Surprisingly, it has now been found that electrocoating finishes having a high electric strength and good throwing power can be prepared if the binder used is a combination of (A) a polymer, polycondensate or polyadduct having a mean molecular weight of 800 to 8,000 and a content of basic, primary and/or secondary amino groups of 0.8 to 8 equivalents per 1,000 molecular weight units and (B) one or more phenolic Mannich bases prepared from one or more polynuclear polyphenols, formaldehyde or a formaldehyde donor and one or more secondary aliphatic amines, not more than one equivalent of a secondary amine and not more than 2 equivalents of formaldehyde being employed per equivalent of phenol for the preparation of the component (B).

The present invention relates to a binder, for cathodic electrocoating, which is rendered water-dilutable by the addition of an acid, contains non-tertiary basic amino groups in addition to phenolic Mannich bases and consists of a mixture or precondensate of (A) 50 to 90 percent by weight of a polymer, polycondensate or polyadduct having a mean molecular weight of 800 to 8,000 and a content of basic, primary and/or secondary amino groups of 0.8 to 8 equivalents per 1,000 molecular weight units and (B) 10 to 50 percent by weight of one or more phenolic Mannich bases, prepared from
  (a) one or more polynuclear polyphenols,
  (b) formaldehyde or a formaldehyde donor and
  (c) one or more secondary aliphatic amines, the sum of the percentages stated under (A) and (B) being 100, wherein not more than one equivalent of a secondary amine (c) and not more than 2 equivalents of formaldehyde are employed per equivalent of phenolic hydroxyl groups of the polyphenol (a) for the preparation of the component (B).

In the preparation of the component (B), 0.5 to 1 equivalent of a secondary amine (c) and 0.5 to 2 equivalents of formaldehyde (b) are preferably employed per equivalent of phenolic hydroxyl groups of the polyphenol (a).

Component (A) can be, for example, a reaction product of an aliphatic diamine and an aromatic epoxy resin and may additionally be modified by further reaction with mono- and/or dicarboxylic acids, and component (B) can be prepared using, as the polynuclear polyphenol, for example, a reaction product of bisphenol A and less than the stoichiometric amount of a diglycidyl ether of bisphenol A (for example up to 0.8 equivalent of epoxide groups of a diglycidyl ether of bisphenol A per equivalent of phenolic hydroxyl groups of bisphenol A).

The mixture of components (A) and (b) can also be partially reacted at elevated temperature.

The present invention furthermore relates to a process for the preparation of the binder and a process for the cathodic electrocoating of electrically conductive articles, wherein the binder, if necessary in combination with other binders, pigments and other assistants and additives conventionally employed in electrocoating, is rendered water-dilutable by the addition of an acid.

Regarding the components of the novel binder, the following may be stated specifically:

In order to obtain the novel advantageous properties, it is essential that, during the preparation of component (B), not more than one amine molecule is incorporated per phenol nucleus. It is assumed that the amine, together with formaldehyde, is incorporated selectively in the o-position with respect to the hydroxyl group, as an aminomethylene group. Because of the high selectivity of the reaction, there is no significant disubstitution on the same phenol nucleus. It is assumed that the resulting aminomethylated phenols carry groups according to formula (I), ie. possess only one aminomethyl group in the o-position with respect to the phenolic hydroxyl group, the basicity of which is greatly reduced by the formation of hydrogen bridges.

In this formula, $R_1$ and $R_2$ are identical or different alkyl groups of 1 to 10 carbon atoms and can, if required, carry substituents, such as hydroxyl or ether groups, or together form a 5-membered to 7-membered ring.

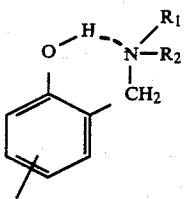

(I)

Hence, in the preparation of electrocoating baths, the phenolic Mannich bases employed as component (B) are not protonated so that the electrical properties of the baths, such as electric strength, throwing power and deposition equivalent, are not adversely affected.

(A) Suitable components (A) are those polymers, polycondensates or polyadducts which have a mean molecular weight of 800 to 8,000, preferably 1,200 to 4,000, and a content of basic, primary and/or secondary amino groups of 0.8 to 8 equivalents per 1,000 molecular weight units.

Examples of polymers which can be employed are polyacrylates which are prepared by copolymerization of 10 to 70 percent by weight of methacrylates or methacrylamides which carry a secondary amino group, for example isopropylaminopropylmethacrylamide, with 30 to 90 percent by weight of other monomers, such as (meth)acrylates, acrylonitrile, styrene, etc.

Examples of polycondensates which can be employed are condensates of polycarboxylic acids and polyamines. Reaction products of dimerized or trimerized fatty acids and polyamines, such as ethylenediamine, 1,2- and 1,3-diaminopropane, diethylenetriamine, dipropylenetriamine, triethylenetetramine etc., are suitable as component (A) provided that they contain 0.8 to 8 equivalents of basic, primary and/or secondary amino groups per 1,000 molecular weight units, in addition to the amide nitrogen.

Particularly suitable polyadducts are the reaction products of polyepoxide compounds with amines which contain at least one primary amino group.

A possible method of obtaining products which are suitable as component (A) and possess primary and secondary amino groups is to react an excess of primary diamines with epoxy resins and then separate off the excess amine at elevated temperature and under reduced pressure. Particularly suitable diamines for this purpose are those having 2 to 6 carbon atoms, for example ethylenediamine, 1,2- and 1,3-diaminopropane, 1,4-diaminobutane, neopentanediamine and hexamethylenediamine. The reaction products can, if desired, be subjected to chain-lengthening reactions with dicarboxylic acids, for example with sebacic acid or a dimeric fatty acid. The desired molecular weight can be established by means of the ratio of dicarboxylic acid to epoxide/amine adduct, for example 1 mole of dimeric fatty acid can be employed per two molecules of epoxide/amine adduct. It is also possible for monocarboxylic acids, for example stearic acid or fatty acids, to be used concomitantly. Moreover, instead of an plastification in the chain or in conjunction with it, elastification at the chain end can be carried out by reaction with long-chain monoepoxides, such as hexadecyl glycidyl ether or Versatic acid diglycidyl ester.

Another possible method of preparing products which are suitable as component (A) and possess primary amino groups is to react epoxy resins with secondary amines which contain blocked primary amino groups. Examples of such amines are the diketimine of diethylenetriamine, the ketimine of aminoethylethanolamine, the ketimine of N-methylethylenediamine and the ketimine of N-aminoethylpiperazine. The ketimines can be prepared in a simple manner from the free amines and a ketone, for example methyl isobutyl ketone, water being separated off. In the reaction with epoxy resins, only the secondary amino group reacts, and the ketimine can then be cleaved simply by adding water, the free primary amino group being formed again.

By reacting some of the primary amino groups with dicarboxylic acids, these products, too, can be elastified by chain lengthening.

(B) In principle, any secondary aliphatic amine (c) can be used for the preparation of the aminomethylated phenols (B). Preferably used amines are those which possess a certain volatility, for example those having a boiling point of less than 250° C. under a pressure of 1,000 mbar. Examples of suitable amines are dialkylamines, such as dimethylamine or diethylamine, methylethanolamine, ethylethanolamine, morpholine and piperidine. Dialkylamines whose alkyl groups together contain 5 to 15 carbon atoms, for example ethylpropylamine, dipropylamine, diisopropylamine, dibutylamine, diisobutylamine, dipentylamine, dihexylamine or dicyclohexylamine, and mixtures of these dialkylamines, are particularly preferred.

Primary amines, for example methylamine, ethylamine, propylamine or butylamine, can also be used concomitantly in minor amounts.

Suitable polyphenols (a) are all polynuclear phenols which have at least 2 phenol nuclei and carry in the molecule at least two hydrogen atoms ortho to different hydroxyl groups.

Examples of such polynuclear phenols are those of the general formula (II)

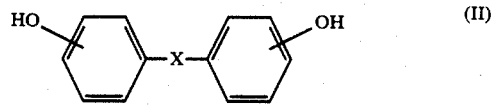

(II)

where the hydroxyl groups are in the ortho- or para-position with respect to X, and X is a straight-chain or branched, divalent aliphatic radical of 1 to 3 carbon atoms or

—O— or —CH$_2$—NR—CH$_2$— (where R is an alkyl radical of 1 to 16 carbon atoms); a preferred polyphenol according to formula II is bisphenol A. Other suitable polyphenols are low molecular weight reaction products of phenols and formaldehyde, so-called novolaks. The required polyphenols can also be produced in situ from monophenols and formaldehyde if, during the aminomethylation, formaldehyde is employed in amounts greater than the amount equivalent to the amine used.

Reaction products of polyphenols and polyepoxides can also be employed, and an excess of phenolic OH groups over epoxide groups has to be used. Such a chain-lenghtened phenol can be prepared, for example, from 2 moles of bisphenol A and one mole of the diglycidyl ether of bisphenol A and epichlorohydrin.

The amines are incorporated into the polyphenols via a methylene bridge. Formaldehyde or a formaldehyde donor (b) (for example paraformaldehyde) is required for this purpose. This reaction of the phenols with an aldehyde and a secondary amine is called aminomethylation or a Mannich reaction. The reaction can be carried out at room temperature, but advantageously at an elevated temperature of up to about 150° C. Solvents are not required in this process. It is also unnecessary to remove the water formed during the reaction. However, the water can be removed without difficulty under reduced pressure or using an organic solvent as an entraining agent.

As mentioned above, the Mannich reaction can be carried out without a solvent provided that the reaction products are liquid at the reaction temperature. However, it is also possible to employ conventional solvents, such as alcohols, ketones, esters, ethers of hydrocarbons. Examples of suitable solvents are butanol, methyl isobutyl ketone, toluene and ethylglycol acetate.

To prepare the binders according to the invention, 50 to 90, preferably 60 to 80, % by weight of component (A) are mixed with 10 to 50, preferably 20 to 40, % by weight of component (B), either as such or, advantageously, diluted with organic solvents. It is often advantageous to render the components more compatible by partial condensation. To do this, it is sufficient to heat the mixture of the components for some time, for example at 35° to 110° C., preferably 50° to 100° C. The progress of the partial condensation reaction, in which essentially free methylol groups or aminomethylene groups of component (B) react with the primary or secondary amino groups of component (A), can be monitored by measuring the increase in viscosity. Partially condensed binders frequently require smaller amounts of neutralizing agents and give more stable dispersions than the mixture of components (A) and (B).

To prepare an aqueous dispersion, an acid, for example formic acid, acetic acid or lactic acid, is added to the binder composition (A)+(B), and the mixture is then diluted to the processing concentration. However, it is also possible to allow the binder composition to run slowly into stirred, acidified water. For the preparation of electrocoating baths, other binders, pigments and further assistants and additives conventionally used in electrocoating, such as solvents, dispersants, antifoams or other resin components, can be added to the binder according to the invention. The electrocoating baths usually have a solids content of 5 to 30% by weight. Deposition is usually carried out at temperatures of 15° to 40° C. for a period of 1 to 5 minutes at an applied voltage of 50 to 500 V. The electrically conductive body to be coated, for example an article consisting of copper, aluminum or steel sheet, which may or may not have been chemically pretreated, for example phosphatized, is connected as the cathode in this process. The film deposited is cured at temperatures of 120° to 200° C., preferably 130° to 180° C., in the course of 5 to 45, preferably 10 to 30, minutes.

The Examples which follow are intended to illustrate the invention without restricting it. In the Examples, parts and percentages are by weight, unless stated otherwise.

PREPARATION OF THE COMPONENT (A)

Component (A1)

640 parts of a diglycidyl ether based on bisphenol A and epichlorohydrin and having an epoxide equivalent weight of 485 and 160 parts of a diglycidyl ether of this type having an epoxide equivalent weight of 189 are mixed at 100° C. In another vessel, 452 parts of hexamethylenediamine are initially taken and heated to 100° C., and 720 parts of the above hot epoxy resin mixture are added in the course of one hour, it being necessary to carry out slight cooling in order to keep the temperature at 100° C. After a further 30 minutes, the excess hexamethylenediamine is stripped off while increasing the temperature and under reduced pressure, a temperature of 205° C. and a pressure of 30 mbar being reached at the end. Thereafter, 57.6 parts of stearic acid, 172.7 parts of a dimeric fatty acid and 115 parts of xylene are added. The water formed is then distilled off azeotropically in the course of 90 minutes at 175°–180° C. 58 parts of butylglycol and 322 parts of isobutanol are then added. The product has a solids content of 70% and a viscosity of 2240 mPas, measured at 75° C. using a plate-and-cone viscometer.

Component (A2)

An adduct of ethylenediamine and an epoxy resin is prepared as described in U.S. Pat. No. 4,369,290, Example IX (i), and is plasticized with hexadecene oxide.

Component (A3)

The procedure described in the preparation of component (A1) is followed, except that, instead of hexamethylenediamine, the same amount of 2-methylpentamethylenediamine is employed. The product is brought to a solids content of 70%, as stated there. The viscosity is 1,600 mPas, measured at 75° C. using a plate-and-cone viscometer.

PREPARATION OF COMPONENT (B)

Component (B1)

228 parts (2 equivalents) of bisphenol A, 258 parts (2 moles) of di-n-butylamine and 69.3 parts (corresponding to 2.2 moles of formaldehyde) of paraformaldehyde are heated for 2 hours at 80° C. Thereafter, the mixture is diluted to a solids content of 80% with 89 parts of isobutanol.

Component (B2)

114 parts (1 equivalent) of bisphenol A, 103.2 parts (0.8 mole) of dibutylamine and 34.65 parts (corresponding to 1.1 moles of formaldehyde) of paraformaldehyde are heated for 2 hours at 80° C. The water formed is then stripped off at 80° C. and under a pressure of 25 mbar.

Component (B3)

The procedure described in the preparation of component (B2) is followed, except that 116.1 parts (0.9 mole) of dibutylamine are employed.

Component (B4)

150 parts of a polytetrahydrofuran-α,ω-diamine (molecular weight about 750), 114.4 parts of 4,4-bis-p-hydroxyphenylvaleric acid and 16.4 parts of a hydrocarbon mixture having a high content of aromatics and a boiling point of about 150° C. (eg. ® Solvesso 150) are heated for 5 hours at 190° C., the water formed being distilled off azeotropically. Thereafter, 15.4 parts of ethylene glycol monoethyl ether, 98 parts of dibutylamine, 25.2 parts of paraformaldehyde and 111.8 parts of isobutanol are added, and the mixture is heated for 3 hours at 80° C. The product obtained has a solids content of 70%.

Component (B5)

152 parts of bisphenol A, 63 parts of a diglycidyl ether of bisphenol A having an epoxide equivalent weight of 189 and 0.1 part of tributylphosphine are heated for 1 hour at 160° C., after which epoxide can no longer be detected and a diphenol having an extended chain has formed (1 equivalent). 53.8 parts of isopropanol, 129 parts (1 mole) of dibutylamine, 31.5 parts (corresponding to 1 mole of formaldehyde) of paraformaldehyde and 17.6 parts of isobutanol are added to the mixture, and heating is continued for 2 hours at 80° C. The product has a solids content of 80%.

Component (B6)

228 parts of bisphenol A, 63 parts of paraformaldehyde, 129 parts of dibutylamine and 36.5 parts of n-butylamine are heated for 2 hours at 80° C., after which the mixture is diluted with 52.5 parts of isobutanol and 52.5 parts of isopropanol. The product obtained in this manner has a solids content of 80%.

Component (B7)

The procedure described for the preparation of component (B5) is followed, except that, instead of 129 parts of dibutylamine, 101 parts of di-n-propylamine are employed.

EXAMPLES 1 TO 8

The Examples below illustrate the use of the binder compositions according to the invention in cathodic electrocoating finishes.

A pigment paste is first prepared by milling
110 parts of component (A1),
36 parts of ethylene glycol monobutyl ether,
3 parts of acetic acid,
145 parts of rutile,
35 parts of aluminum silicate,
10 parts of lead silicate,
2.5 parts of carbon black, and
170 parts of water
in a ball mill until the particle size is <7 μm.

The particular components (A) and (B) are mixed in amounts such that the resulting mixture contains 137 parts of solids in the ratio of 70% of component (A) and 30% of component (B). The stated amount of acetic acid is added, and a dispersion is prepared with 300 parts of demineralized water, while stirring. 139 parts of the above pigment paste are then added, and the mixture is made up to 1,000 parts with demineralized water. The electrocoating baths prepared in this manner are stirred for 2 days at 27° C. Thereafter, a steel sheet connected as the cathode is coated at the stated voltage in the course of 2 minutes, and the coating is then baked for 20 minutes at 140° C. The Table below shows the results.

| Example | Components | Parts of acetic acid, based on 100 parts of solids | Bath pH | Deposition voltage | Layer thickness | Resistance to solvents* | Throwing power according to Ford | ASTM salt spray test, 500 hours** |
|---|---|---|---|---|---|---|---|---|
| 1 | $A_1, B_2$ | 3.0 | 8.09 | 280 V | 20 μm | 1 | 21 cm | 0.1 |
| 2 | $A_1, B_3$ | 3.0 | 8.2 | 250 V | 20 μm | 1 | 23 cm | 0.2 |
| 3 | $A_1, B_4$ | 3.2 | 8.6 | 250 V | 32 μm | 1 | 22 cm | 0.25 |
| 4 | $A_1, B_5$ | 3.0 | 8.45 | 270 V | 18 μm | 2 | 24.5 cm | 0.2 |
| 5 | $A_1, B_6$ | 3.0 | 8.24 | 310 V | 19 μm | 1 | 25 cm | 0.1 |
| 6 | $A_1, B_7$ | 3.2 | 8.05 | 270 V | 18 μm | 1 | 20 cm | 0.2 |
| 7 | $A_2, B_3$ | 3.2 | 7.91 | 150 V | 15 μm | 1 | 17 cm | 0.4 |
| 8 | $A_3, B_1$ | 3.0 | 7.95 | 230 V | 19 μm | 1 | 20 cm | 0.3 |

*Rubbing forward and back 50 times with an acetone-impregnated cottonwool ball. Rating 1 equals not attacked, rating 2 equals very slightly attacked.
**Underpenetration at the cut, in mm

COMPARATIVE EXAMPLE

Example Ixii of U.S. Pat. No. 4,369,290 was repeated using 100 parts of component (A2) and 13.1 parts of 2,4,6-trisdimethylaminophenol. The pH was 6.0, and the maximum achievable deposition voltage was 25 V. The film deposited and baked for 20 minutes at 180° C. contained holes and had very little resistance to solvents. After being rubbed forward and back with an acetone-impregnated cottonwool ball only five times, the film was found to have been rubbed through down to the steel sheet. The throwing power according to Ford was less than 5 cm. In a second experiment, the amount of lactic acid used for neutralization was halved. However, it was not possible to disperse the binder in water.

We claim:

1. A binder for cathodic electrocoating which is rendered water-dilutable by the addition of an acid, contains non-tertiary basic amino groups in addition to phenolic Mannich bases and consists of a mixture precondensate of
   (A) 50 to 90 percent by weight of an addition polymer, a condensation polymer or a polymer adduct having a mean molecular weight of 800 to 8,000 and a content of basic primary and secondary or only secondary amino groups of 0.8 to 8 equivalents per 1,000 molecular weight units and
   (B) 10 to 50 percent by weight of one or more phenolic Mannich bases, prepared from
      (a) one or more polynuclear polyphenols which have at least two phenol nuclei and carry in the molecule at least two hydrogen atoms ortho to different hydroxyl groups,
      (b) formaldehyde or a formaldehyde donor and
      (c) one or more secondary aliphatic amines,
   the sum of the percentages stated under (A) and (B) being 100, wherein not more than about one equivalent of a secondary amine (c) and not more than 2 equivalents of formaldehyde (b) are employed per equivalent of phenolic hydroxyl groups of the polyphenol (a) for the preparation of the component (B).

2. The binder of claim 1, wherein 0.5 to 1 equivalent of a secondary amine (c) and 0.5 to 2 equivalents of formaldehyde (b) are employed per equivalent of phenolic hydroxyl groups of the polyphenol (a) for the preparation of component (B).

3. The binder of claim 1, wherein component (A) used is a reaction product of an aliphatic diamine and an aromatic epoxy resin.

4. The binder of claim 2, wherein component (A) used is a reaction product of an aliphatic diamine and an aromatic epoxy resin.

5. The binder of claim 3, wherein the reaction product of an aliphatic diamine and an aromatic epoxy resin has been modified by further reaction with mono- and/or dicarboxylic acids.

6. The binder of claim 4, wherein the reaction product of an aliphatic diamine and an aromatic epoxy resin has been modified by further reaction with at least one of monocarboxylic or dicarboxylic acids.

7. The binder of claim 1, wherein a reaction product of bisphenol A and less than the stoichiometric amount of a diglycidyl ether of bisphenol A is used as the polynuclear polyphenol (a) for the preparation of component (B).

8. The binder of claim 7, wherein a reaction product of bisphenol A and a diglycidyl ether of bisphenol A is used as the polynuclear polyphenol (a) for the preparation of the component (B), with the proviso that up to 0.8 equivalent of epoxide groups of a diglycidyl ether of bisphenol A is employed per equivalent of phenolic hydroxyl groups of the bisphenol A.

9. The binder of claim 1, wherein at least one dialkylamine whose alkyl groups together contain 5 to 15 carbon atoms is used as the secondary aliphatic amine for the preparation of component (B).

10. The binder of claim 1, wherein di-n-butylamine is used as the secondary aliphatic amine for the preparation of component (B).

11. The binder of claim 1, wherein the components (A) and (B) are partially reacted with one another at elevated temperature.

12. The binder of claim 11, wherein components (A) and (B) are partially reacted with one another at 35° to 110° C.

13. A process for the preparation of a binder which contains non-tertiary basic amino groups in addition to phenolic Mannich bases and is rendered water-dilutable by the addition of an acid, wherein 50 to 90% by weight of an addition polymer, a condensation polymer or a polymer adduct having a mean molecular weight of 800 to 8,000 and a content of basic, primary and secondary or only secondary amino groups of 0.8 to 8 equivalents per 1,000 molecular weight units is mixed with 10 to 50% by weight of one or more phenolic Mannich bases and, if required, the components are partially reacted with one another at 35° to 110° C., with the proviso that the Mannich bases are prepared from
   (a) one or more polynuclear polyphenols which have at least two phenol nuclei and carry in the molecule at least two hydrogen atoms ortho to different hydroxyl groups,
   (b) formaldehyde or a formaldehyde donor and
   (c) one or more secondary aliphatic amines,
   not more than about one equivalent of a secondary amine (c) and not more than two equivalents of formaldehyde (b) being employed per equivalent of phenolic hydroxyl groups of the polyphenol (a).

* * * * *